(12) United States Patent
Bulicz et al.

(10) Patent No.: US 7,168,396 B1
(45) Date of Patent: Jan. 30, 2007

(54) VARIABLE COMPRESSION RATIO STRATEGY FOR IMPROVING COMBUSTION PROCESSES IN ALTERNATIVE COMBUSTION COMPRESSION IGNITION ENGINES

(75) Inventors: Tytus R. Bulicz, Palos Hills, IL (US); Xinqun Gui, Naperville, IL (US); William de Ojeda, Chicago, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/227,010

(22) Filed: Sep. 15, 2005

(51) Int. Cl.
*F02B 1/12* (2006.01)
*F01L 1/34* (2006.01)

(52) U.S. Cl. .................. 123/27 R; 123/90.15

(58) Field of Classification Search ............ 123/90.15, 123/90.16, 27 R, 316, 435
See application file for complete search history.

(56) References Cited

U.S. PATENT DOCUMENTS

| | | | | |
|---|---|---|---|---|
| 5,365,895 | A * | 11/1994 | Riley | 123/90.16 |
| 6,044,815 | A | 4/2000 | de Ojeda | |
| 6,263,842 | B1 | 7/2001 | de Ojeda et al. | |
| 6,530,361 | B1 * | 3/2003 | Shiraishi et al. | 123/435 |
| 6,640,754 | B1 * | 11/2003 | Iida | 123/27 R |
| 6,758,177 | B1 * | 7/2004 | McKay et al. | 123/90.15 |
| 6,941,910 | B2 * | 9/2005 | Methley | 123/90.15 |
| 6,957,640 | B1 * | 10/2005 | Liu et al. | 123/305 |
| 7,040,266 | B1 * | 5/2006 | Sun et al. | 123/90.15 |
| 2002/0078918 | A1 * | 6/2002 | Ancimer et al. | 123/295 |
| 2003/0116124 | A1 * | 6/2003 | Lawrence et al. | 123/90.16 |
| 2004/0103860 | A1 * | 6/2004 | zur Loye et al. | 123/27 R |
| 2005/0016496 | A1 * | 1/2005 | Hitomi et al. | 123/305 |

* cited by examiner

*Primary Examiner*—Noah P. Kamen
(74) *Attorney, Agent, or Firm*—Susan L. Lukasik; Elias P. Soupos; Jeffrey P. Calfa

(57) ABSTRACT

A compression ignition engine (10) has a control system (24) for processing data, one or more cylinders (16), a fueling system (18), and a variable valve actuation mechanism (20). Control system (24) develops both fueling data for fueling the engine and timing data representing time during the engine cycle for intake valve closure to a cylinder that will endow the cylinder with an effective compression ratio (ECR) appropriate to current engine operation for causing auto-ignition to occur near or at top dead center in the engine cycle. During a compression upstroke, the cylinder is fueled according to the fueling data and intake valve closure for the cylinder is performed according to the timing data. This creates an air-fuel mixture that is increasingly compressed to the point of auto-ignition near or at top dead center.

12 Claims, 4 Drawing Sheets

FSN IMPROVEMENT OVER SPEED-LOAD MAP

VARIABLE COMPRESSION RATIO STRATEGY FOR IMPROVING COMBUSTION PROCESSES IN ALTERNATIVE COMBUSTION COMPRESSION IGNITION ENGINES

FIELD OF THE INVENTION

This invention relates generally to internal combustion engines of the compression ignition type. More specifically it relates to a discovery for improving alternative combustion processes in such engines by selectively varying compression ratio. In a disclosed embodiment this improvement is realized by a variable valve actuation strategy for controlling effective compression ratio in a manner that creates an in-cylinder air-fuel charge that is increasingly compressed during piston upstroke without igniting and finally auto-ignites near or at top dead center.

BACKGROUND OF THE INVENTION

HCCI is a known process for fueling a diesel engine in a manner that creates a substantially homogeneous air-fuel charge inside an engine cylinder during a compression upstroke of an engine cycle. After a desired quantity of fuel for the charge has been injected into the cylinder to create a generally homogeneous air-fuel mixture, the increasing compression of the charge by the upstroking piston creates sufficiently large pressure to cause auto-ignition of the charge. In other words, the HCCI mode of operation of a diesel engine may be said to comprise 1) injecting a desired amount of fuel into a cylinder at an appropriate time during the compression upstroke so that the injected fuel mixes with charge air that has entered the cylinder during the preceding intake downstroke and early portion of the compression upstroke in a manner that forms a substantially homogeneous mixture within the cylinder without combusting, and then 2) increasingly compressing the mixture to the point of auto-ignition near or at top dead center (TDC). Auto-ignition may occur as the substantially simultaneous spontaneous combustion of vaporized fuel at various locations within the mixture. No additional fuel is injected after auto-ignition.

One of the attributes of HCCI is that relatively lean, or dilute, mixtures can be combusted, keeping the combustion temperatures relatively low. By avoiding the creation of relatively higher combustion temperatures, HCCI can yield significant reductions in the generation of $NO_x$, an undesired constituent of engine exhaust gas.

Another attribute of HCCI is that auto-ignition of a substantially homogeneous air-fuel charge generates more complete combustion and consequently relatively less soot in engine exhaust.

The potential benefit of HCCI on reducing tailpipe emissions is therefore rather significant, and consequently HCCI is a subject of active investigation and development by many scientists and engineers in the engine research and design community.

HCCI may be considered one of several alternative combustion processes for a compression ignition engine. Other processes that may be considered alternative combustion processes include Dilution Controlled Combustion Systems (DCCS) and Highly Premixed Combustion Systems (HPCS).

By whatever name an alternative system or process may be called, a common attribute is that fuel is injected into a cylinder during a piston upstroke to form an air-fuel charge that is increasingly compressed until auto-ignition occurs near or at top dead center (TDC).

If such alternative processes are not be suitable over the full range of engine operation for any particular engine, the engine may be fueled in the traditional conventional diesel manner where charge air is compressed to the point where it causes the immediate ignition of fuel upon fuel being injected into a cylinder, typically very near or at top dead center where compression is a maximum.

With the availability of processor-controlled fuel injection systems capable of controlling fuel injection with precision that allows fuel to be injected at different injection pressures, at different times, and for different durations during an engine cycle over the full range of engine operation, a diesel engine becomes capable of operating by alternative combustion processes and/or traditional diesel combustion.

The advent of variable valve actuation systems allows timing of engine valves to be processor-controlled in various ways, and with precision. As will be explained by later description, the present invention takes advantage of the capabilities of such fuel injection and variable valve actuation systems to control fuel injection and valve timing in various ways that can improve a diesel engine by significant reductions in engine-out emissions. Some modes of valve actuation are even accompanied by modest fuel economy improvements.

Because a diesel engine that powers a motor vehicle runs at different speeds and loads depending on various inputs to the vehicle and the engine that influence engine operation, fueling requirements change as speed and load change. An associated processing system processes data indicative of parameters such as engine speed and engine load to develop control data for setting desired engine fueling for particular operating conditions that will assure proper control of the fuel injection system for various combinations of engine speed and engine load. A variable valve timing system can also controlled in a different ways according to engine speed-load conditions.

SUMMARY OF THE INVENTION

Modulation (both continuous modulation and controlled increase and decrease) of the ignition delay period for HCCI, DCCS, HPCS, and other alternative internal combustion processes has disclosed, both theoretically and experimentally, the possibility of significant reductions in engine-out emission level, including NOx and soot. One of the factors that can be used effectively for influencing ignition delay is Effective Compression Ratio (ECR), defined as a ratio of in-cylinder pressure at the end of a compression stroke to the in-cylinder pressure at the end of an effective intake stroke.

The present invention relates to the use of certain variable valve actuation strategies for effective ECR control when an engine is fueled for alternative combustion processes like those mentioned. While a principal benefit of the invention is reduction in engine-out emissions, it is contemplated that optimization can yield improvement in other aspects of engine performance in a motor vehicle, including gains in fuel economy, noise reduction, and better cold-starting and drivability. Moreover, the invention can be embodied in a cost-effective manner in production vehicles that already have electronic engine control systems and variable valve actuation systems.

Various mechanisms that are disclosed in various patents and technical literature may be used to induce change in ECR of an engine. One is a simple phase mechanism that is widely used in gasoline engines and is capable of adjusting the effective compression ratio by phasing or delaying the intake valve timing. Such a phasing mechanism may however have limited use in a diesel engine application due to tight clearance that exists between the engine valves and piston at TDC and due to pumping losses that can occur by delaying the intake valve event in order to obtain significant changes in ECR.

Other mechanical systems possess the capability for adjusting valve lift and duration simultaneously by introducing a control shaft with pivot element between the cam and the valve itself, allowing intake valve closing to be modulated while maintaining the intake portion of the valve profile close to baseline.

Electro-hydraulic devices may also be used to adjust valve lift, and thus timing of valve profiles. A dual or multiple lift system has been adopted by some automotive manufacturers.

A completely electromagnetic device that provides large flexibility to the engine valve motion has been described in published literature but as yet is not believed to be in production vehicles.

Similarly, several fully flexible systems based on electro-hydraulic mechanisms have been proposed, but like the completely electromagnetic devices, have not yet been introduced into production engines.

Commonly owned U.S. Pat. Nos. 6,044,815 and 6,263,842 relate to hydraulically-assisted engine valve actuators that can change individual valves and control individual cylinders for better combustion control and are useful in compensating for different charge temperatures resulting from different cylinder locations in an engine.

Principles of the invention can also be applied to engines that have mechanisms for changing geometric compression ratio although such mechanisms may be more complex and difficult to implement in a compression ignition engine.

The present invention relates to an engine, system, and method for enhancing the use of HCCI combustion in a diesel engine toward objectives that include further reducing the generation of undesired constituents in engine exhaust, especially soot and $NO_x$, and further improving thermal efficiency. Significant reductions in exhaust soot can have favorable implications for soot control strategies.

The invention is embodied partly in the fuel injection control strategy, a strategy that is programmed in an associated processing system, and partly in an engine compression ratio control strategy, a strategy which it is presently believed can be more practically implemented as an effective engine compression ratio strategy using a variable valve actuation mechanism.

One generic aspect of the present invention relates to a method of operating a compression ignition engine that has a processor-based engine control system controlling both a fueling system for fueling the engine and a variable valve actuation mechanism that varies timing of intake valves that open and close an intake system to individual engine cylinders.

The method comprises processing certain data to develop both fueling data for fueling the engine and timing data representing time during the engine cycle for intake valve closure to a cylinder that will endow the cylinder with an effective compression ratio (ECR) appropriate to current engine operation for causing auto-ignition to occur near or at top dead center in the engine cycle.

During a compression upstroke, the cylinder is fueled according to the fueling data and intake valve closure for the cylinder is performed according to the timing data to cause fuel in the cylinder to mix with charge air that has entered the cylinder from the intake system during an immediately preceding intake downstroke and early portion of the compression upstroke.

The mixture is then increasingly compressed to the point of auto-ignition near or at top dead center.

A further generic aspect relates to a compression ignition engine that operates according to the method just described.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
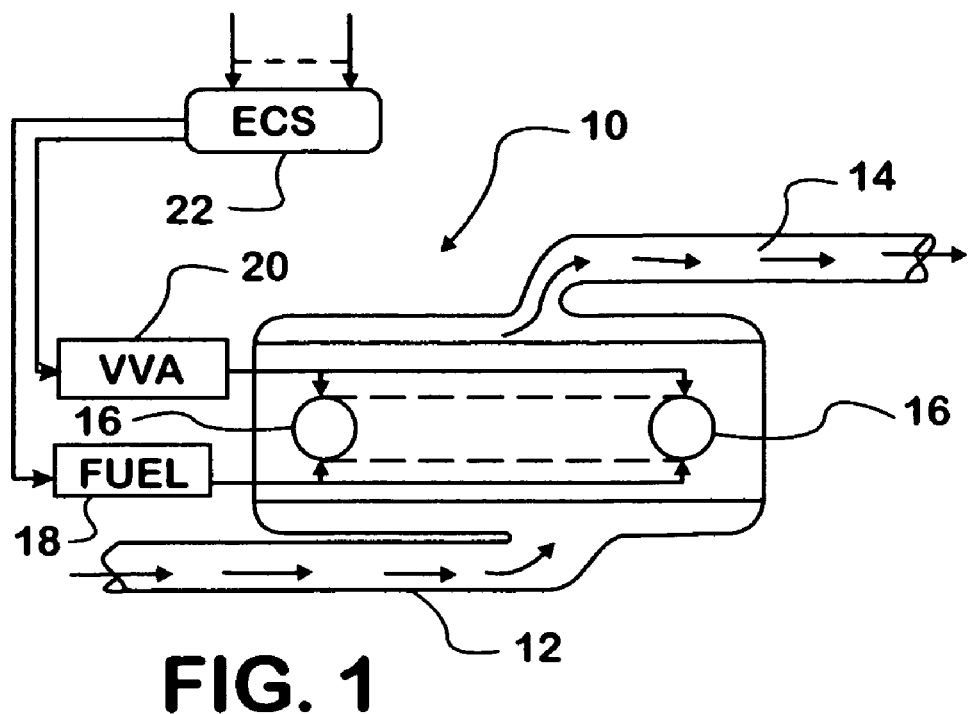
FIG. 1 is a schematic portrayal of portions of an engine relevant to principles of the invention.

FIG. 1 shows portions of an exemplary internal combustion engine 10 that embodies principles of the present invention. Engine 10 comprises an intake system 12 through which charge air for combustion enters the engine and an exhaust system 14 through which exhaust gases resulting from combustion exit the engine. Engine 10 operates on the principle of compression ignition, not spark ignition, and may be turbocharged. When used as the prime mover of a motor vehicle, such as a truck, engine 10 is coupled through a drivetrain to driven wheels that propel that the vehicle.

Engine 10 comprises multiple cylinders 16 (either in an in-line configuration of a V-configuration) forming combustion chambers into which fuel is injected by fuel injectors of a fuel system 18 to mix with charge air that has entered through intake system 12. Pistons that reciprocate within cylinders 16 are coupled to an engine crankshaft.

An air-fuel mixture in each cylinder 16 combusts under pressure created by the corresponding piston as the engine cycle passes from its compression phase to its power phase, thereby driving the crankshaft, which in turn delivers torque through the drivetrain to the wheels that propel the vehicle. Gases resulting from combustion are exhausted through exhaust system 14.

Engine 10 has intake and exhaust valves associated with cylinders 16. A variable valve actuation system 20 opens and closes at least the intake valves and may also open and close the exhaust valves. Each cylinder has at least one intake valve and at least one exhaust valve.

Engine 10 also comprises an engine control system (ECS) 22 that comprises one or more processors that process various data to develop data for controlling various aspects of engine operation. ECS 22 acts via appropriate interfaces with both fuel system 18 and variable valve actuation system 20 to control the timing and amount of fuel injected by each fuel injector and at least the opening and closing of the intake valves, possibly the opening and closing of the exhaust valves, too.

In accordance with principles of the invention, ECS 22 causes the engine to be fueled, at least at times, for a form of alternative combustion, such as those mentioned earlier. In conjunction with that fueling, ECS 22 controls variable valve actuation system 20 in a manner that creates an ECR for the particular fueling that will cause auto-ignition near or at piston TDC. While each individual cylinder may be fueled in the same way and have the same ECR, certain cylinders may be fueled differently and operated with different ECR if the fueling system and the variable valve actuation system possess capabilities that allow for such variation.

As engine speed and/or load changes, fueling requirements change. Auto-ignition however still needs to occur near or at TDC. ECS 22 takes this into account by processing certain data to yield fueling data for fueling system 18 to provide proper fueling, and data that will cause variable valve actuation system 20 to set a suitable ECR for auto-ignition near or at TDC. ECS 22 may have one or more maps, or look-up tables, that correlate various combinations of engine speed and engine load with correspondingly appropriate fueling values that can be processed in any suitably appropriate manner to yield fueling commands to devices in the fueling system.

ECS 22 may also have one or more maps that correlate various combinations of engine speed and torque with correspondingly appropriate ECR values that can be processed in any suitably appropriate manner to yield commands for desired timing of cylinder intake valves that will cause auto-ignition near or at TDC for the particular engine speed and fueling (torque).

Figure 2:
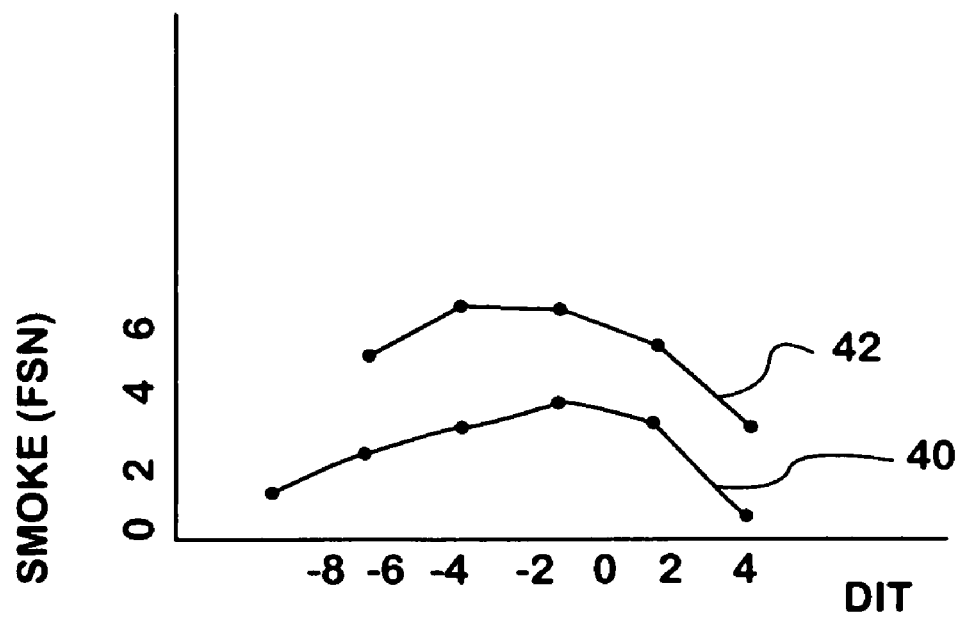
FIG. 2 is a graph comparing the smoke component of engine-out emissions when an engine was run using two different piston bowl geometries at one effective compression ratio.
Figure 3:
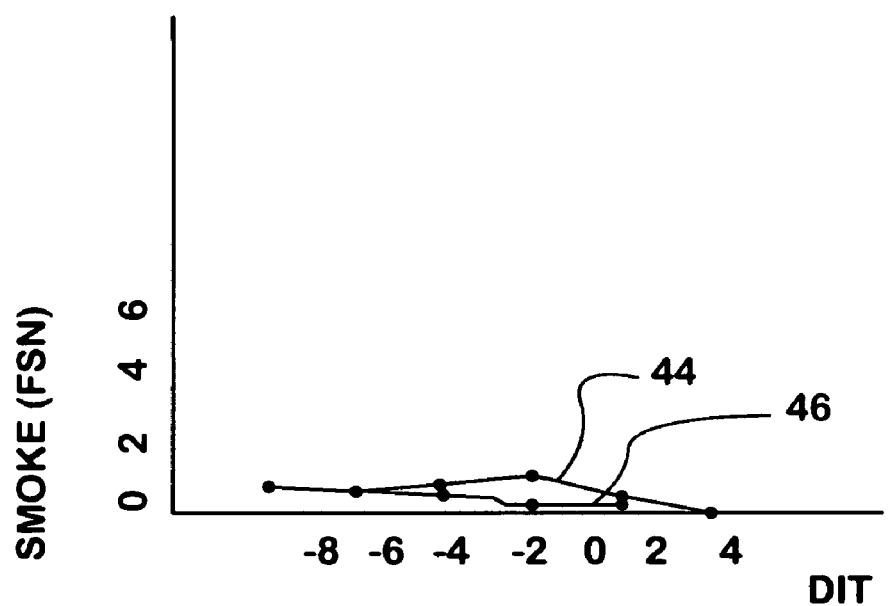
FIG. 3 is a graph comparing the smoke component of engine-out emissions when the engine was run using the two different piston bowl geometries but at a different effective compression ratio.
Figure 4:
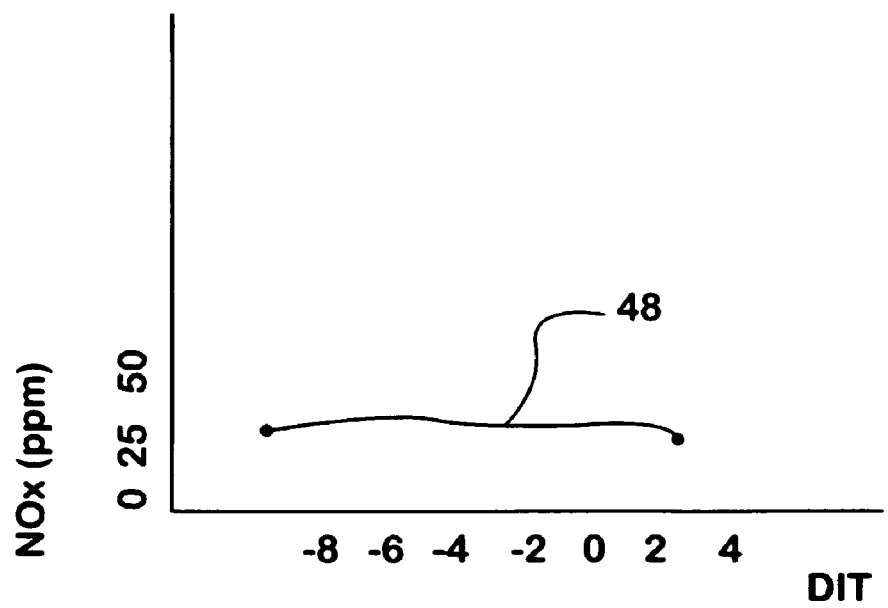
FIG. 4 is a graph generally indicative of the NOx component of engine-out emissions for the various running conditions of FIGS. 2 and 3.

Effectiveness of the invention is shown by FIGS. 2, 3, and 4 which contain engine-out emission data for a diesel engine running in DCCS combustion mode.

In FIG. 2, a first trace 40 represents smoke data when the engine was run at a certain compression ratio (CR1) using pistons whose bowls had a certain shape (BWL1). A second trace 42 represents smoke data when the engine was run at CR1 using pistons whose bowls had a different shape (BWL2). The bowls having the shapes BWL2 can be considered baseline bowls. The BWL1 bowls have geometries that provide improved charge air turbulence and fuel spray mixing, resulting in lower smoke, when compared with the baseline bowls. Compression ratio CR1 is substantially 18:1.

In FIG. 3, a first trace 44 represents smoke data when the engine was run at a different compression ratio (CR2) using pistons having the BWL1 bowls. A second trace 46 represents smoke data when the engine was run at CR2 using pistons whose the BWL2 bowls. Compression ratio CR2 is substantially 15:1.

FIG. 4 shows a trace 48 representing NOx data that is essentially representative of NOx generated when the engine was running to generate each trace 40, 42, 44, 46. This shows that NOx was largely unchanged.

Comparison of FIGS. 2 and 3 discloses that when compression ratio was geometrically varied on two different combustion bowls (BWL1 and BWL2) within a range 18:1–15:1 (i.e. when dimensions of bowls has been physically modified and pistons with those bowls have been changed in the test engine between related tests) the level of soot emission decreased dramatically—by approximately one order of magnitude-while the NOx emission remained essentially unchanged. Because at least a part of such significant soot reduction is definitely caused by effect of compression ratio on ignition delay and related improvement in charge homogenization, a similar effect can be obtained if the bowl geometry would be kept constant but compression ratio changed by some other means, such as variable valve actuation that can be operated to cause the engine to run at different effective compression ratios.

Figure 5:
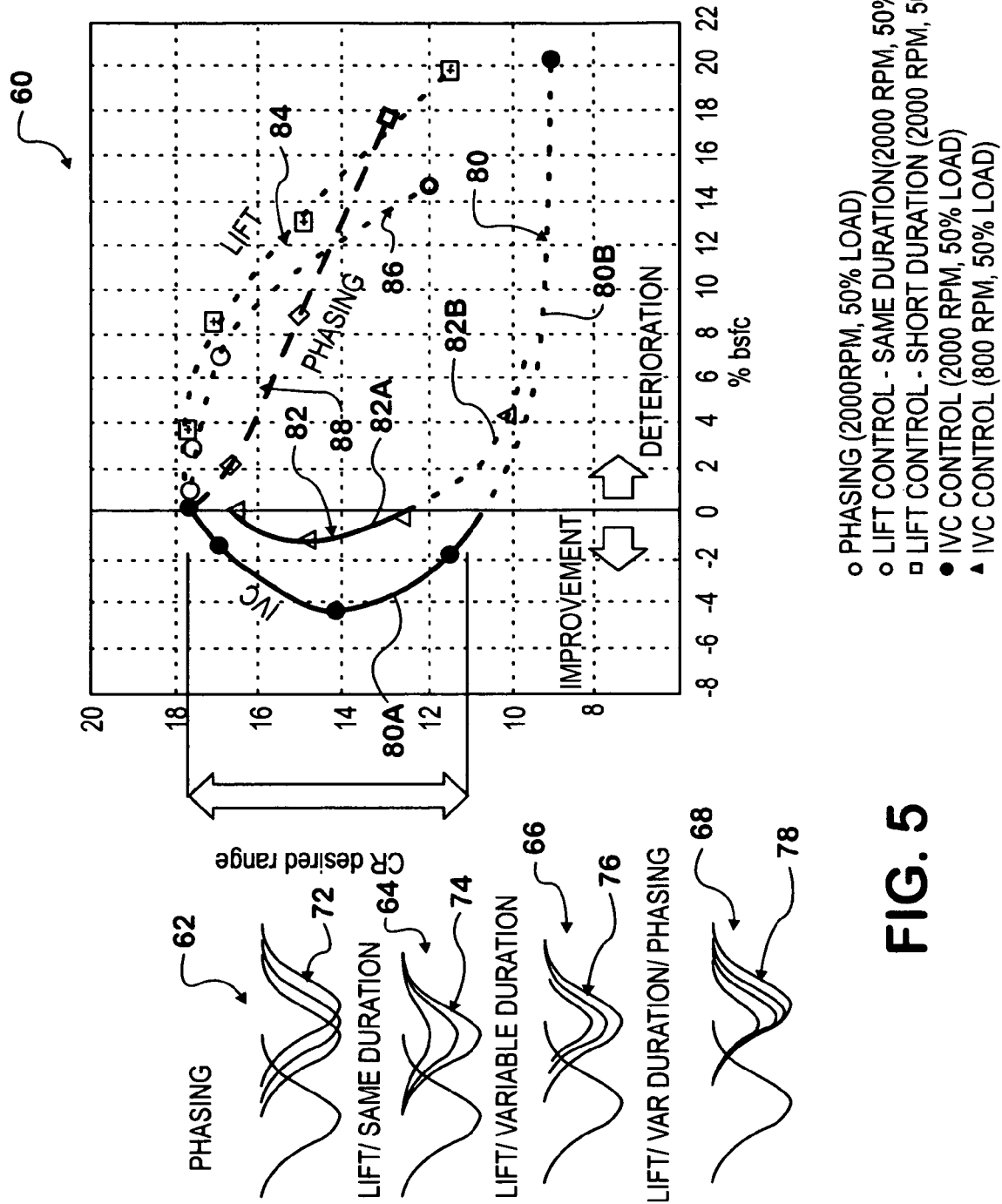
FIG. 5 is a graph illustrating the effect on effective compression ratio and basic specific fuel consumption of using various variable valve actuation strategies.

FIG. 5 summarizes results of an analytical investigation of the effects of different variable valve actuation strategies on ECR and engine brake fuel consumption (BSFC) when geometry of combustion chamber remains fixed. In general, the variable valve actuation strategies were based on different means for varying the opening and closing events of both intake and exhaust valves, changing magnitudes of valve lifts, and shifting the intake and exhaust valve lift profiles relative to each other. As can be seen, all of those strategies offer significant range of ECR modulation when combustion bowl geometry is constant, indicating that variable valve actuation can be used as a powerful and consistent ECR controlling parameter.

FIG. 5 comprises a graph 60 that illustrates several variable valve actuation techniques that can be effective in accomplishing significant smoke reduction. Over certain ranges of effective compression ratio, modest fuel economy improvements can be achieved. Over other ranges, there is some fuel economy penalty.

The generic operational characteristics of the various valve actuation techniques that can vary effective compression ratio are schematically depicted by the associated timing diagrams 62, 64, 66, 68. All diagrams show common exhaust valve timing 70.

Diagram 62 shows representative intake valve operation 72 where that intake valve lift and open duration (as measured in engine degrees) are constant, but phasing of valve opening is being varied.

Diagram 64 shows representative intake valve operation 74 where intake valve open duration and phasing are constant, but lift is being varied.

Diagram 66 shows representative intake valve operation 76 where intake valve phasing is constant, but lift and duration are being varied.

Diagram 68 shows representative intake valve operation 78 where intake valve, open duration, and phasing are being varied.

Trace 80 in graph 60 is a result of the use of IVC to control intake valve operation when a test engine was run at 2000 rpm and 50% load. IVC is represented by diagram 68 using short duration lift 78A. The vertical axis of the graph measures compression ratio while the horizontal axis measures fuel consumption in % bsfc. Trace 80 comprises two segments 80A and 80B. Segment 80A shows fuel consumption improvement when compression ratio is varied within a range from about 11 to about 18. Hence, that would be a preferred range for steady state engine operation at that speed and load.

Trace 82 in graph 60 is a result of the use of IVC to control intake valve operation when a test engine was run at 800 rpm and 50% load. Trace 82 comprises two segments 82A and 82B. Segment 82A shows fuel consumption improvement when compression ratio is varied within a range from about 12.5 to almost 16.5. Hence, that would be a preferred range for steady state engine operation at that speed and load.

Trace 84 is a result of using short duration lift control shown in diagram 66 by the reference numeral 76 with the engine operating at 2000 rpm and 50% load.

Trace 86 is a result of using same duration lift control shown in diagram 64 by the reference numeral 74 with the engine operating at 2000 rpm and 50% load.

Trace 88 is a result of using phasing control shown in diagram 62 by the reference numeral 72 with the engine operating at 2000 rpm and 50% load. Traces 84, 86 and 88 are capable to reduced effective compression ratio but it is done at a penalty to bsfc.

Figure 6:
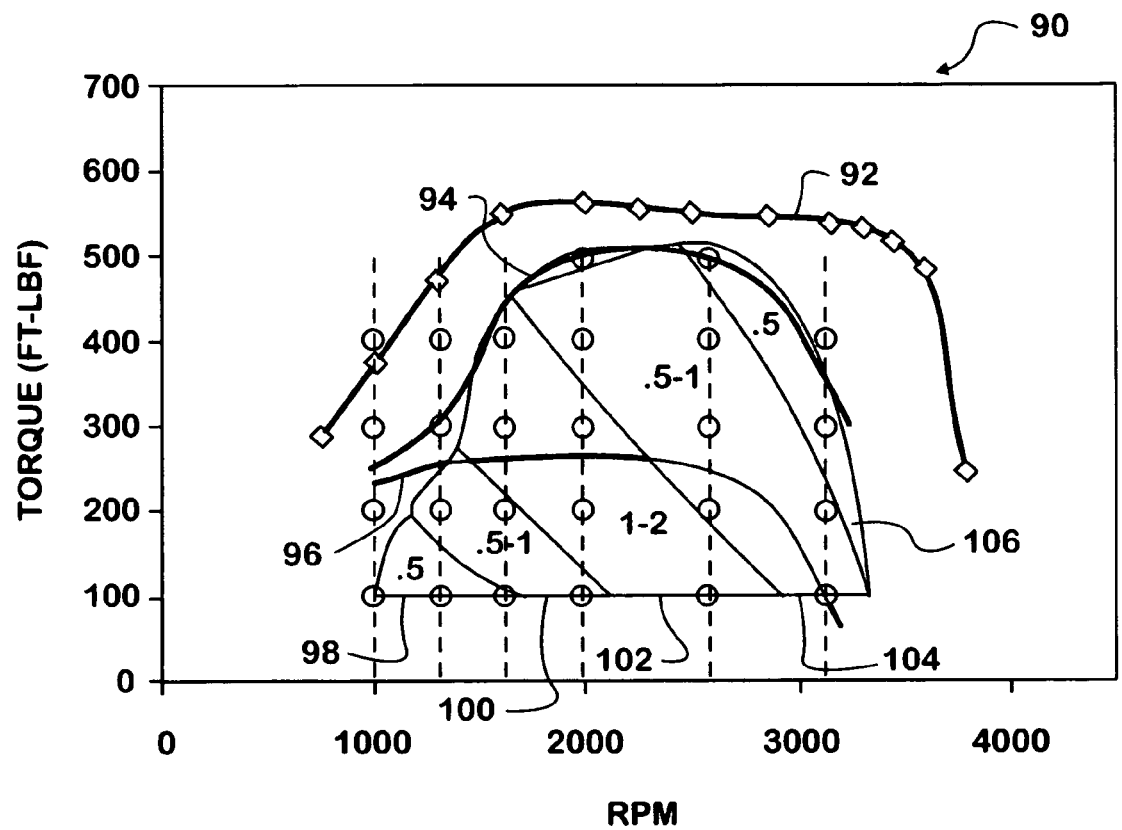
FIG. 6 is a graph representing improvements in smoke reduction by applying a variable valve actuation system over the speed and load range of the engine.

FIG. 6 shows a diagram 90 where the vertical axis represents engine torque (in foot-pounds) and the horizontal axis represents engine speed (in rpm—revolutions per minute). A trace 92 represents baseline data for an engine, torque output at full throttle also known as lug line. Traces 94 and 96 represent boundaries differentiating the use of cams for optimum effective compression ratio to limit smoke output. Data represented in FIG. 6 was obtained using three cams, one is the engine baseline cam, and the others with reduced duration per the method described in 68. Above trace 94, the baseline cam is used. Between traces 94 and 96, cam with an earlier intake valve closing with respect to the baseline cam yields smoke reduction. Below trace 96, smoke reduction is accomplished by further advancing the intake valve closing.

FIG. 6 also shows five speed-torque zones 98, 100, 102, 104, 106 each representing a range of improved smoke reduction by applying the varying intake valve closing timings as indicated by the traces 94 and 96. In zones 98 and 106, the smoke number has been reduced anywhere from 0.0 to 0.5 when compared with the baseline data. In zones 100 and 104, the smoke number has been reduced anywhere from 0.5 to 1.0 when compared with the baseline data. In zone 102, the smoke number has been reduced anywhere from 1.0 to 2.0 when compared with the baseline data.

Because variable valve actuation offers continuous modulation of valve timing, ECR can be fully optimized in relation to specific demands of boundary conditions.

Another application of variable compression ratio is cold starting. Cold start requires higher ECR. From cold-start, higher-ECR regime, variable valve actuation can provide effective transition into lower-ECR regime supporting low emission alternative combustion scheme.

While a presently preferred embodiment of the invention has been illustrated and described, it should be appreciated that principles of the invention apply to all embodiments falling within the scope of the following claims.

What is claimed is:

1. A method of operating a compression ignition engine that powers a motor vehicle and has a processor-based engine control system controlling both a fueling system for fueling the engine and a variable valve actuation mechanism that varies operation of intake valves that open and close an intake system to individual engine cylinders, the method comprising:

processing engine speed and engine load data using one or more maps that correlate various combinations of engine speed and engine load with corresponding fueling data to develop fueling data for fueling the engine and processing the developed fueling data and engine speed data using one or more maps that correlate various combinations of engine speed and fueling with corresponding intake valve operation data to develop intake valve operation data for controlling intake valve operation for a cylinder during an engine cycle to endow the cylinder with an effective compression ratio (ECR) appropriate to current engine operation for causing auto-ignition to occur near or at top dead center in the engine cycle;

during a compression upstroke, fueling the cylinder according to the developed fueling data and controlling intake valve operation for the cylinder according to the developed intake valve operation data to cause fuel in the cylinder to mix with charge air that has entered the cylinder from the intake system during an immediately preceding intake downstroke and early portion of the compression upstroke; and then increasingly compressing the mixture to the point of auto-ignition near or at top dead center.

2. A method as set forth in claim 1 wherein the step of controlling intake valve operation for the cylinder according to the developed intake valve operation data includes developing valve lift data for setting lift that is imparted to an intake valve for the cylinder when the intake valve opens to allow charge air to enter the cylinder.

3. A method as set forth in claim 1 wherein the step of controlling intake valve operation for the cylinder according to the developed intake valve operation data includes developing valve phasing data for setting phasing that is imparted to an intake valve for the cylinder to set the phase of the engine cycle during which the intake valve is open.

4. A method as set forth in claim 1 wherein the step of controlling intake valve operation for the cylinder according to the developed intake valve operation data includes developing valve duration data for setting the duration for which an intake valve for the cylinder is open during the engine cycle.

5. A compression ignition engine that powers a motor vehicle and comprises:

a fueling system for fueling the engine;

a variable valve actuation mechanism that varies operation of intake valves that open and close an intake system to individual engine cylinders;

a processor-based engine control system controlling both the fueling system and the variable valve actuation mechanism;

wherein the control system processes engine speed and engine load data using one or more maps that correlate various combinations of engine speed and engine load with corresponding fueling data to develop fueling data for the fueling system to fuel the engine and processing the developed fueling data and engine speed data using one or more maps that correlate various combinations of engine speed and fueling with corresponding intake valve operation data to develop intake valve operation data for controlling operation of an intake valve for a cylinder during an engine cycle to endow the cylinder with an effective compression ratio (ECR) appropriate to current engine operation for causing auto-ignition to occur near or at top dead center in the engine cycle; and during a compression upstroke, causes the fueling system to fuel the cylinder according to the developed fueling data and causes the variable valve actuation mechanism to operate the intake valve for the cylinder according to the developed intake valve operating data, thereby mixing fuel with charge air that has entered the cylinder from the intake system during an immediately preceding intake downstroke and early portion of the compression upstroke and increasingly compressing the mixture to the point of auto-ignition near or at top dead center.

6. An engine as set forth in claim 5 wherein the variable valve actuation mechanism comprises a lift control for controlling the amount of intake valve lift in accordance with the developed intake valve operation data.

7. An engine as set forth in claim 5 wherein the variable valve actuation mechanism comprises a phase control for controlling phasing of intake valve opening during the engine cycle in accordance with the developed intake valve operation data.

8. An engine as set forth in claim 5 wherein the variable valve actuation mechanism comprises a duration control for controlling duration of intake valve opening during the engine cycle in accordance with the developed intake valve operation data.

9. A method of operating a compression ignition engine that powers a motor vehicle and has a processor-based engine control system controlling both a fueling system for fueling the engine and a mechanism for varying engine compression ratio, the method comprising:

processing engine speed and engine load data using one or more maps that correlate various combinations of engine speed and engine load with corresponding fueling data to develop fueling data for fueling a cylinder of the engine and processing the developed fueling data and engine speed data using one or more maps that correlate various combinations of engine speed and fueling with corresponding compression ratio data to develop compression ratio data for an engine compression ratio appropriate to current engine operation for causing auto-ignition to occur in the cylinder near or at top dead center in an engine cycle;

fueling the cylinder in accordance with the developed fueling data and operating the mechanism for varying compression ratio in accordance with the developed compression ratio data to cause fuel to be introduced into the cylinder and mix with charge air that has entered the cylinder during an immediately preceding intake downstroke and early portion of an ensuing compression upstroke so as to create a substantially homogeneous charge; and then increasingly compressing the charge to the point of auto-ignition near or at top dead center.

10. A method as set forth in claim 9 wherein the step of operating the mechanism for varying compression ratio in accordance with the developed compression ratio data comprises operating a variable valve actuation mechanism in accordance with the developed compression ratio data to set an effective compression ratio.

11. A compression ignition engine that powers a motor vehicle and comprises:

a fueling system for fueling the engine;

a mechanism for varying engine compression ratio;

a processor-based engine control system controlling both the fueling system and the mechanism;

wherein the control system processes engine speed and engine load data using one or more maps that correlate various combinations of engine speed and engine load with corresponding fueling data to develop fueling data for the fueling system to fuel a cylinder of the engine and processing the developed fueling data and engine speed data using one or more maps that correlate various combinations of engine speed and fueling with corresponding compression ratio data to develop compression ratio data for an engine compression ratio appropriate to current engine operation for causing auto-ignition in the cylinder to occur near or at top dead center in the engine cycle; and during a compression upstroke, causes the mechanism to set the compression ratio for the cylinder according to the developed compression ratio data and causes the fueling system to fuel the cylinder according to the developed fueling data so that fuel mixes with charge air that has entered the cylinder from the intake system during an immediately preceding intake downstroke and early portion of the compression upstroke and increasing compression of the mixture causes auto-ignition of the mixture near or at top dead center.

12. An engine as set forth in claim 11 wherein the engine comprises a variable valve actuation mechanism for varying compression ratio in accordance with the developed compression ratio data to set an effective compression ratio.

* * * * *